(12) United States Patent
Kim et al.

(10) Patent No.: US 9,712,249 B2
(45) Date of Patent: Jul. 18, 2017

(54) METHODS AND SYSTEMS FOR SUPERCHANNEL SUBCARRIER MONITORING USING AMPLITUDE MODULATED TONES

(71) Applicant: Fujitsu Limited, Kawasaki-shi, Kanagawa (JP)

(72) Inventors: Inwoong Kim, Allen, TX (US); Olga Vassilieva, Plano, TX (US); Motoyoshi Sekiya, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 76 days.

(21) Appl. No.: 14/790,934

(22) Filed: Jul. 2, 2015

(65) Prior Publication Data

US 2017/0005726 A1 Jan. 5, 2017

(51) Int. Cl.
*H04B 10/077* (2013.01)
*H04B 10/548* (2013.01)

(52) U.S. Cl.
CPC ....... *H04B 10/548* (2013.01); *H04B 10/0775* (2013.01); *H04B 2210/075* (2013.01)

(58) Field of Classification Search
CPC ............ H04B 10/548; H04B 10/07955; H04B 10/616; H04B 10/0775; H04B 10/077; H04J 14/0221
See application file for complete search history.

(56) References Cited

U.S. PATENT DOCUMENTS

| 4,918,396 A | * | 4/1990 | Halemane | ............. | H01S 5/0014 359/333 |
| 9,485,019 B1 | * | 11/2016 | Kim | ................. | H04B 10/07955 |
| 9,485,554 B1 | * | 11/2016 | Kim | ................... | H04Q 11/0066 |
| 2008/0019704 A1 | * | 1/2008 | Campillo | ......... | H04B 10/07951 398/185 |
| 2013/0251365 A1 | * | 9/2013 | Sone | ..................... | H04B 17/00 398/38 |

OTHER PUBLICATIONS

Bosco et al., "A Novel Update Algorithm in Stokes Space for Adaptive Equalization in Coherent Receivers", OFC 2014/OSA 2014, 3 pages, 2014.
Nakagawa et al., "Evaluation of FSK Light Labels Superimposed on 112 Gbps DP-QPSK Signal with Real-time Coherent Receiver and Optical Filter Based Decoder for Light Path Tracing", OFC/NFOEC Technical Digest 2013 OSA, 3 pages, 2013.
(Continued)

*Primary Examiner* — Tesfaldet Bocure
(74) *Attorney, Agent, or Firm* — Baker Botts L.L.P.

(57) ABSTRACT

Methods and systems for superchannel subcarrier monitoring using amplitude modulated (AM) tones include modulating an optical subcarrier of a superchannel with a first frequency that is chosen to be substantially smaller than a baud rate for data modulated onto the optical subcarrier. Certain pairs of subcarriers in the superchannel may be modulated with AM tones having a common frequency with complementary phase for power equalization. Then, downstream detection and monitoring of the optical subcarrier may be performed based on demodulation of the first frequency. Each optical subcarrier in the superchannel may be modulated using a respectively unique combination of AM tone and phase.

20 Claims, 9 Drawing Sheets

(56) References Cited

OTHER PUBLICATIONS

Nakagawa et al., "Crosstalk Analysis of FSK Light Label on 112 Gbps DP-QPSK Signal in CNCG ROADM Network", OFC 2014/0SA2014, 3 pages, 2014.
Tanimura et al., "Superimposition and Detection of Frequency Modulated Tone for Light Path Tracing Employing Digital Signal Processing and Optical Filter", OFC/NFOEC Technical Digest 2012 OSA, 3 pages, 2012.
Vessilieva et al., U.S. Appl. No. 14/790,918 entitled "Methods and Systems for SuperChannel Subcarrier Monitoring Using Frequency Modulation Tones"; 47 pages, Jul. 2, 2015.
Kim et al., U.S. Appl. No. 14/790,967 entitled "Methods and Systems for Periodic Optical Filtering to Identify Tone Modulated Optical Signals"; 47 pages, Jul. 2, 2015.
Kim et al., U.S. Appl. No. 14/790,998 entitled "Methods and Systems for Using Modulation Frequencies for Optical Channel Monitoring with Periodic Optical Filtering"; 55 pages, Jul. 2, 2015.
Kim et al., U.S. Appl. No. 14/791,020 entitled "Methods and Systems for Optical Channel Monitoring with Periodic Optical Filtering of Dual Polarization Signals"; 55 pages, Jul. 2, 2015.

\* cited by examiner

METHODS AND SYSTEMS FOR SUPERCHANNEL SUBCARRIER MONITORING USING AMPLITUDE MODULATED TONES

BACKGROUND

Field of the Disclosure

The present disclosure relates generally to optical communication networks and, more particularly, to methods and systems for superchannel subcarrier monitoring using amplitude modulated (AM) tones.

Description of the Related Art

Telecommunications systems, cable television systems and data communication networks use optical networks to rapidly convey large amounts of information between remote points. In an optical network, information is conveyed in the form of optical signals through optical fibers. Optical networks may also include various network nodes such as amplifiers, dispersion compensators, multiplexer/demultiplexer filters, wavelength selective switches, couplers, etc. to perform various operations within the network.

Optical superchannels are an emerging solution for transmission of signals at 400 Gb/s and 1 Tb/s data rate per channel, and hold promise for even higher data rates in the future. A typical superchannel includes a set of subcarriers that are frequency multiplexed to form a single wavelength channel. The superchannel may then be transmitted through an optical network as a single channel across network endpoints. The subcarriers within the superchannel are tightly packed to achieve high spectral efficiency.

SUMMARY

In one aspect, a disclosed method is for monitoring subcarriers of superchannels using amplitude modulation (AM). The method may include amplitude modulating, at an optical transmitter of an optical transport network, a first frequency onto a first optical subcarrier modulated with carrier data at an optical transmission frequency. In the method, the first frequency is smaller than the optical transmission frequency. The method may include combining the first optical subcarrier with additional optical subcarriers to form a superchannel having a fixed transmission band, and transmitting the superchannel over at least a portion of the optical transport network. The method may further include receiving the superchannel via the optical transport network. The method may also include, using the first frequency, demodulating the superchannel received to generate a power spectrum indicative of a power intensity of the first frequency over the fixed transmission band.

In any of the disclosed embodiments, the method may further include, based on the power spectrum, determining a center frequency of the first optical subcarrier within the fixed transmission band. In any of the disclosed embodiments, the method may further include, based on the power spectrum, determining an indication of a passband for the first optical subcarrier. In any of the disclosed embodiments, the method may further include, based on the power spectrum, determining an indication of an optical signal power of the first optical subcarrier within the fixed transmission band. In the method, a peak-to-peak power modulation amplitude at the first frequency may be less than 10% of the optical signal power.

In any of the disclosed embodiments of the method, demodulating the superchannel received may include scanning a tunable bandpass filter tuned to the first frequency over at least a portion of the fixed transmission band of the superchannel. In the method, demodulating the superchannel received may further include digitizing a power signal indicative of an output of the tunable bandpass filter, and using a digital signal processor to resolve the power spectrum.

In any of the disclosed embodiments of the method, the first frequency may be less than about 300 MHz.

In any of the disclosed embodiments, the method may further include, amplitude modulating the additional optical subcarriers. In the method, adjacent optical subcarriers may be amplitude modulated with different frequencies. In the method, at least some pairs of non-adjacent optical subcarriers may be amplitude modulated using a common frequency. In the method, each optical subcarrier in a pair may be amplitude modulated using the common frequency with a complementary phase to the other optical subcarrier in the pair.

In any of the disclosed embodiments of the method, demodulating the superchannel received may include demodulating a pair of the non-adjacent optical subcarriers using the common frequency based on the complementary phase.

In any of the disclosed embodiments of the method, demodulating the superchannel received may include, when a combination of the first frequency and a phase for the first optical subcarrier is not detected, determining that the first optical subcarrier is not included in the superchannel received.

In another aspect a disclosed optical transport network is enabled for monitoring subcarriers of superchannels using amplitude modulation (AM). The optical transport network may include an optical subcarrier monitor. In the optical transport network, the optical subcarrier monitor may be enabled to receive a superchannel having a fixed transmission band transmitted over at least a portion of the optical transport network. In the optical transport network, the superchannel may include a first optical subcarrier that is modulated with carrier data at an optical transmission frequency and amplitude modulated with a first frequency. In the optical transport network, the first frequency is smaller than the optical transmission frequency. In the optical transport network, the superchannel may include additional optical subcarriers in addition to the first optical subcarrier. In the optical transport network, the optical subcarrier monitor may further be to, using the first frequency, demodulate the superchannel received to generate a power spectrum indicative of a power intensity of the first frequency over the fixed transmission band.

In any of the disclosed embodiments of the optical transport network, the optical subcarrier monitor may determine, based on the power spectrum, a center frequency of the first optical subcarrier within the fixed transmission band. In any of the disclosed embodiments of the optical transport network, the optical subcarrier monitor may determine, based on the power spectrum, an indication of a passband for the first optical subcarrier. In any of the disclosed embodiments of the optical transport network, the optical subcarrier monitor may determine, based on the power spectrum, an indication of an optical signal power of the first optical subcarrier within the fixed transmission band. In the optical transport network, a peak-to-peak power modulation amplitude at the first frequency may be less than 10% of the optical signal power.

In any of the disclosed embodiments of the optical transport network, demodulating the superchannel received by the optical subcarrier monitor may include scanning a tunable bandpass filter tuned to the first frequency over at least a portion of the fixed transmission band of the superchannel received. In any of the disclosed embodiments of the optical transport network, demodulating the superchannel received by the optical subcarrier monitor may include digitizing a power signal indicative of an output of the tunable bandpass filter, and using a digital signal processor to resolve the power spectrum.

In any of the disclosed embodiments of the optical transport network, the first frequency may be less than about 300 MHz.

In any of the disclosed embodiments, the optical transport network may include a plurality of optical transmitters to amplitude modulate the first optical subcarrier and the additional optical subcarriers. In the optical transport network, the plurality of transmitters may be to amplitude modulate the adjacent optical subcarriers. In the optical transport network, adjacent optical subcarriers may be amplitude modulated with different frequencies. In the optical transport network, at least some pairs of non-adjacent optical subcarriers may be amplitude modulated using a common frequency, and each optical subcarrier may be a pair is amplitude modulated using the common frequency with a complementary phase to the other optical subcarrier in the pair.

In any of the disclosed embodiments of the optical transport network, demodulating the superchannel received by the optical subcarrier monitor may include demodulating a pair of the non-adjacent optical subcarriers using the common frequency based on the complementary phase.

In any of the disclosed embodiments of the optical transport network, demodulating the superchannel received by the optical subcarrier monitor may include, when a combination of the first frequency and a phase for the first optical subcarrier is not detected, determining that the first optical subcarrier is not included in the superchannel received.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

Figure 1:
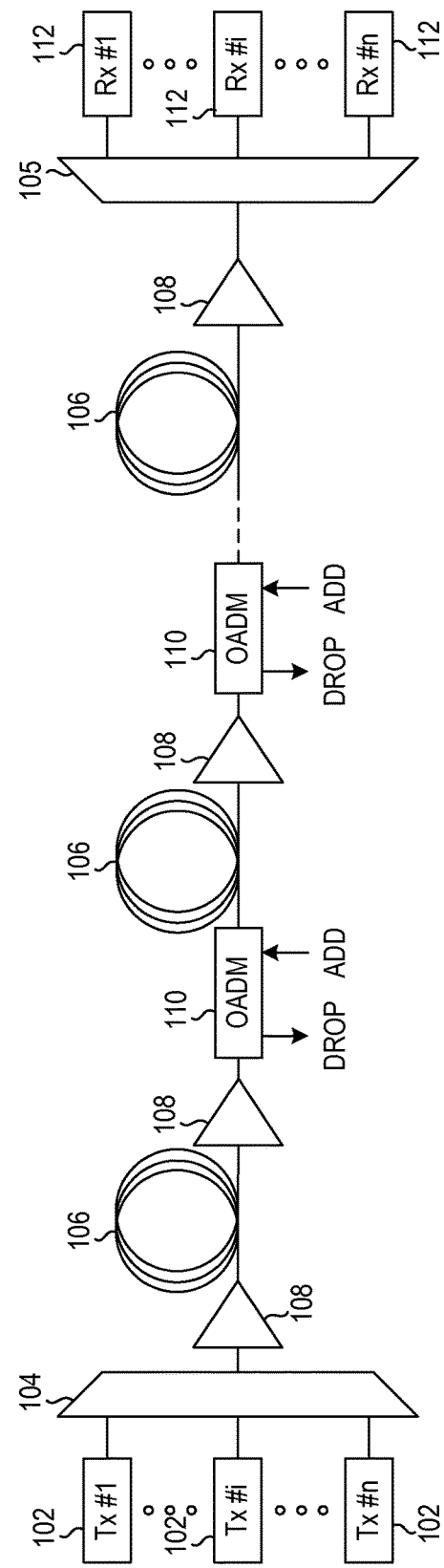
FIG. 1 is a block diagram of selected elements of an embodiment of an optical transport network for superchannel subcarrier monitoring.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

Referring now to the drawings, FIG. 1 illustrates an example embodiment of optical transport network (OTN) 101, which may represent an optical communication system. Optical transport network 101 included one or more optical fibers 106 to transport one or more optical signals communicated by components of optical transport network 101. The network elements of optical transport network 101, coupled together by fibers 106, may comprise one or more transmitters (Tx) 102, one or more multiplexers (MUX) 104, one or more optical amplifiers 108, one or more optical add/drop multiplexers (OADM) 110, one or more demultiplexers (DEMUX) 105, and one or more receivers (Rx) 112.

Optical transport network 101 may comprise a point-to-point optical network with terminal nodes, a ring optical network, a mesh optical network, or any other suitable optical network or combination of optical networks. Optical transport network 101 may be used in a short-haul metropolitan network, a long-haul inter-city network, or any other suitable network or combination of networks. The capacity of optical transport network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a standard Single-Mode Fiber (SMF), Enhanced Large Effective Area Fiber (E-LEAF), or TrueWave® Reduced Slope (TW-RS) fiber.

Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

To increase the information capacity and transport capabilities of optical transport network 101, multiple signals transmitted at multiple channels may be combined into a single wide bandwidth optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may transmit disparate channels using WDM or some other suitable multi-channel multiplexing technique, and to amplify the multi-channel signal.

Recently, advancements in DWDM enabled combining several optical carriers to create a composite optical signal of a desired capacity. One such example of a multi-carrier optical signal is a superchannel, which is an example of high spectral efficiency (SE) that may attain transmission rates of 100 Gb/s or higher. Thus, in a superchannel, subcarriers are tightly packed and consume less optical spectrum than conventional DWDM. Another distinctive feature of superchannels is that the subcarriers in a superchannel travel as a single entity from the same origin to the same destination, and are not typically added or removed using a conventional OADM while in transmission. In some embodiments, the subcarriers in a superchannel may be added and dropped using a wavelength selective switch (WSS). Techniques for achieving high spectral efficiency (SE) in optical networks may include the use of superchannels modulated using dual-polarization quadrature phase-shift keying (DP-QPSK) for long-haul transmission at data rates of 100 Gb/s or greater. In particular embodiments, Nyquist wavelength-division multiplexing (N-WDM) may be used in a superchannel. In N-WDM, optical pulses having a nearly rectangular spectrum are packed together in the frequency domain with a bandwidth approaching the Baud rate (see also FIG. 2).

Optical transport network 101 may include one or more optical transmitters (Tx) 102 to transmit optical signals through optical transport network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106, which is referred to as "in-line amplification". Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA). However, any other suitable amplifier, such as a semiconductor optical amplifier (SOA), may be used.

OADMs 110 may be coupled to optical transport network 101 via fibers 106. OADMs 110 comprise an add/drop module, which may include a system, apparatus or device to add and drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination. In this manner, OADMs 110 may enable connection of different optical transport network topologies together, such as different rings and different linear spans.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADMs) and with conventional implementations of demultiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WSS).

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels. It will be understood that different numbers of channels or subcarriers may be transmitted and demultiplexed in optical transport network 101, in various embodiments.

In FIG. 1, optical transport network 101 may also include receivers 112 coupled to demultiplexer 105. Each receiver 112 may receive optical signals transmitted at a particular wavelength or channel, and may process the optical signals to obtain (demodulate) the information (data) that the optical signals contain. Accordingly, network 101 may include at least one receiver 112 for every channel of the network.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK (BPSK or 2-PSK) using two phases at 0° and 180° (or in radians, 0 and $\pi$) on the constellation diagram; or quadrature PSK (QPSK, 4-PSK, or 4-QAM) using four phases at 0°, 90°, 180°, and 270° (or in radians, 0, $\pi/2$, $\pi$, and $3\pi/2$). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, m-QAM signals may be polarized using techniques such as dual-polarization 16-QAM (DP-16-QAM), wherein separate m-QAM signals are multiplexed by orthogonally polarizing the signals.

Dual polarization technology, which may also be referred to as polarization division multiplexing (PDM), enables achieving a greater bit rate for information transmission. PDM transmission comprises simultaneously modulating information onto various polarization components of an optical signal associated with a channel, thereby nominally increasing the transmission rate by a factor of the number of polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical transport network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, or an operational support system (OSS) which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

In operation, optical transport network 101 may be used to transmit a superchannel, in which a plurality of subcarrier signals are densely packed in a fixed bandwidth and may be transmitted at very high data rates, such as 400 Gb/s, 1 Tb/s, or higher. Furthermore, a superchannel may be well suited for transmission over very long distances, such as hundreds of kilometers, for example. A typical superchannel may comprise a set of subcarriers that are frequency multiplexed to form a single channel and which are transmitted through the entire network as one entity. The subcarriers within the superchannel are tightly packed to achieve high spectral efficiency. In order to minimize linear crosstalk between neighboring subcarriers in the superchannel, Nyquist filtering may be applied at the transmitter side to shape the subcarrier frequency bands (see also FIG. 2).

As noted above, optical superchannels may represent a promising solution for transmission of signals at 400 Gb/s and 1 Tb/s data rate per channel, and beyond to higher data rates. However, the optical power transmitted by each subcarrier in a superchannel may fluctuate, which is undesirable. Various transmission experiments with superchannels have revealed that each subcarrier within a superchannel may experience different amounts of linear and non-linear interactions with neighboring subcarriers, resulting in different received optical signal-to-noise ratio (OSNR) penalties. For example, center subcarriers may suffer from larger non-linear interaction compared to edge subcarriers. Additionally, passband narrowing (PBN), which may occur when a subcarrier is transmitted through one or more ROADM nodes, may introduce power variation on the edge subcarriers. Furthermore, a laser source used at transmitter 102 may become detuned and may contribute to power or spectral fluctuation of a subcarrier wavelength. Also, the power across a superchannel may vary when a subcarrier is dropped during transmission, for example by a ROADM node having a WSS, or when the subcarrier is otherwise impaired during transmission.

Typically, an optical channel monitor (OCM) is used to measure OSNR of a superchannel. However, it may be difficult to detect each individual subcarrier with an OCM. For example, it may be difficult to determine a center frequency of each subcarrier using an OCM, because of the tight spectral packing of the subcarriers in a superchannel, particularly when Nyquist filtering has been applied. In addition, it may be difficult to conclusively identify whether a subcarrier has been dropped or impaired in transmission or whether a spectral fluctuation in wavelength has occurred or to distinguish between these two cases.

As will be described in further detail, various techniques for power and spectral monitoring of individual subcarriers in a superchannel are disclosed. The superchannel subcarrier monitoring techniques disclosed herein may enable precise and accurate detection of individual subcarriers in the spectral domain. The superchannel subcarrier monitoring techniques disclosed herein may enable direct measurement of edge frequencies for each subcarrier in a superchannel. The superchannel subcarrier monitoring techniques disclosed herein may enable determination of a center frequency for each subcarrier in a superchannel. The superchannel subcarrier monitoring techniques disclosed herein may enable monitoring of optical power at the center frequency for each subcarrier in a superchannel. The superchannel subcarrier monitoring techniques disclosed herein may enable monitoring of spectral narrowing for each subcarrier in a superchannel, such as caused by passband narrowing.

In one technique, each subcarrier in a superchannel may be assigned a frequency modulated (FM) tone having a unique frequency, such as in a radio frequency (RF) range. The unique FM tone frequency may then be modulated onto each subcarrier using an optical transmitter. The FM tone may be superimposed with the optical signal representing a data payload transmitted by each subcarrier. Then, an optical subcarrier monitor may be used to precisely and accurately detect the FM tone, thereby enabling monitoring of each subcarrier in the superchannel, as will be explained in further detail.

In another technique, each subcarrier in a superchannel may be assigned an amplitude modulated (AM) tone having a unique frequency, such as in a kilohertz (kHz) frequency range or greater. The unique AM tone frequency may then be modulated onto each subcarrier using an optical transmitter. The AM tone may be superimposed with the optical signal representing a data payload transmitted by each subcarrier. Then, an optical subcarrier monitor may be used to precisely and accurately detect the AM tone, thereby enabling monitoring of each subcarrier in the superchannel, as will be explained in further detail.

In some embodiments, various combinations of FM tones and AM tones may be used for superchannel subcarrier monitoring.

Figure 2:
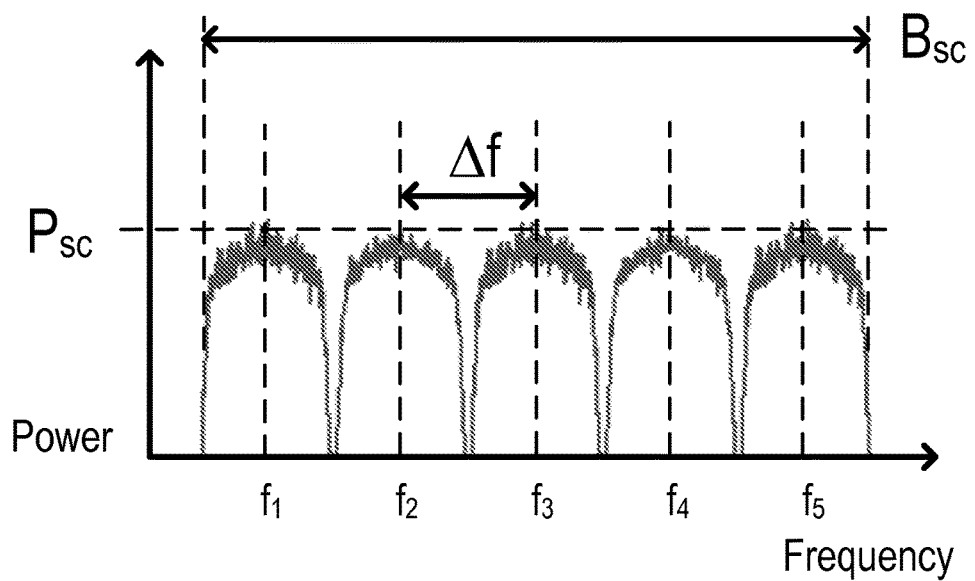
FIG. 2 shows selected elements of an embodiment of a superchannel power spectrum.

Referring to FIG. 2, selected elements of an embodiment of a superchannel is shown as superchannel power spectrum 200, which depicts five (5) subcarriers. While the data used for superchannel power spectrum 200 are not actual measured values, the illustrated power spectrum may be characteristic of an actual superchannel. In superchannel power spectrum 200, the subcarriers may each be modulated with 200 GB/s DP-16-QAM signals. Furthermore, each subcarrier band has been subject to electrical Nyquist pulse shaping in the transmitter using a root raised cosine method using a roll-off factor of 0.15. As shown in FIG. 2, $B_{SC}$ represents the fixed superchannel transmission band, while $\Delta f$ represents the subcarrier frequency spacing. In certain embodiments, the subcarrier frequency spacing $\Delta f$ may be 35 GHz and may be uniform between each center frequency $f_1$, $f_2$, $f_3$, $f_4$, and $f_5$, respectively corresponding to the subcarrier bands. The subcarrier frequency spacing $\Delta f$ may be selected to be wide enough to prevent any significant linear crosstalk between adjacent subcarriers. The optical signal of each subcarrier may be multiplexed using an optical coupler to form the single superchannel in the fixed transmission band $B_{SC}$ having an aggregate data rate of 1 Tb/s, for example. It is noted that different values for the fixed superchannel transmission band, $B_{SC}$, the subcarrier frequency spacing $\Delta f$, and the overall aggregate data rate may result in superchannel power spectrum 200. Also shown in FIG. 2 is constant power level, $P_{SC}$, that is a power level for the superchannel that is substantially similar or equal for each of the 5 subcarrier bands, such that $P_{SC}$, may be proportional to an average power level for each of the subcarrier bands.

In typical DWDM networks, it is known that system performance may depend on an allocation of each wavelength channel on the wavelength grid, such that a longer wavelength channel may suffer from smaller non-linear impairments compared to a shorter wavelength channel. In case of superchannel-based WDM systems, in addition to the wavelength dependency of the subcarrier error rate across the transmission band, $B_{SC}$, a dependency of individual subcarrier error rate (or OSNR at the receiver) on spectral allocation of the subcarrier within the superchannel has now been observed in the form of non-linear impairments (such as cross-talk). Linear cross-talk may be observed between two adjacent subcarrier bands (inter-subcarrier) and may depend on a degree or extent of overlap in the frequency domain of the adjacent subcarrier bands. The use of Nyquist pulse shaping, as shown in FIG. 2, may represent an effective means for maintaining a minimum level of linear cross-talk between adjacent subcarriers, at least in part due to the nearly vertical edges of the Nyquist-shaped subcarrier bands (spectral pulses) that do not substantially overlap each other in the frequency domain. Non-linear cross-talk may also be observed and may arise from non-linear interactions during fiber transmission. The nonlinear interactions may include phenomena such as cross-phase modulation (XPM), self-phase modulation (SPM), and four-wave mixing, among others. Cross-phase modulation may occur when phase information, amplitude information, or both from one channel is modulated to an adjacent channel in the superchannel. Self-phase modulation may arise when a variation in the refractive index (or a dependency of the refractive index on intensity) results in a phase shift within each subcarrier. In four-wave mixing, three wavelengths may interact to create a fourth wavelength that may coincide with a wavelength of a subcarrier, and may lead to undesirable variations in peak power or other types of signal distortion on the affected subcarrier. Furthermore, non-linear cross-talk may comprise inter-subcarrier components. Since non-linear interactions occur during fiber transmission and may not depend on a degree of overlap of the subcarrier frequency bands, Nyquist pulse shaping may be ineffective in resolving problems with non-linear cross-talk in a superchannel.

As will be described in further detail herein, at least some of the subcarrier bands depicted in simulated frequency spectrum 200 may be modulated with a unique FM tone for superchannel subcarrier monitoring. As will also be described in further detail herein, at least some of the subcarrier bands depicted in simulated frequency spectrum 200 may be modulated with an AM tone for superchannel subcarrier monitoring. In some embodiments, certain combinations of modulation techniques using FM tones and AM tones may be applied to subcarriers used for superchannel subcarrier monitoring.

Figure 3A:
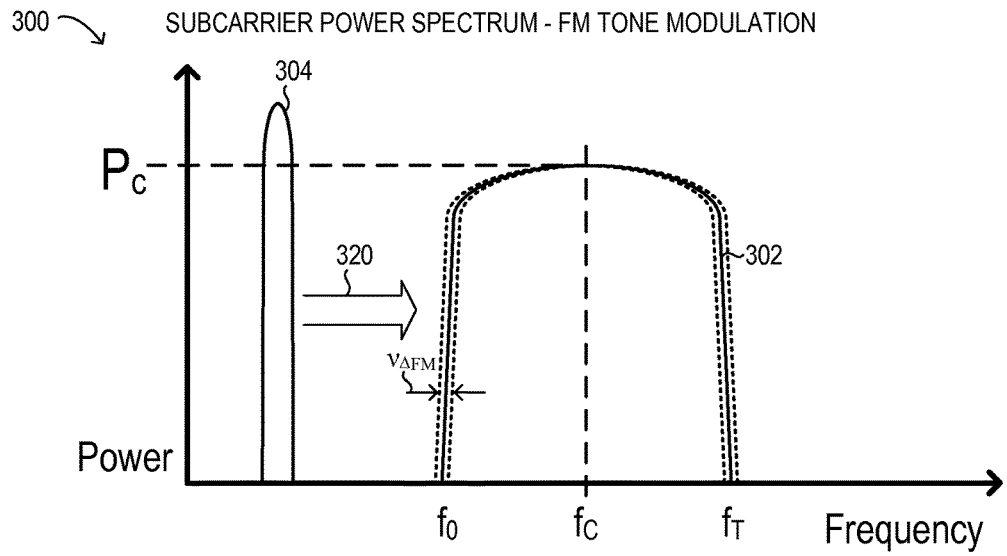
FIG. 3A is a subcarrier power spectrum showing selected elements of an embodiment of FM tone modulation.

Referring now to FIG. 3A, a subcarrier power spectrum 300 showing selected elements of an embodiment of FM tone modulation is illustrated. In subcarrier power spectrum 300, a single optical subcarrier is shown as subcarrier band 302. As shown in FIG. 3A, subcarrier band 302 is depicted in simplified form for descriptive clarity, yet may still correspond to the subcarrier bands depicted in superchannel power spectrum 200 (see FIG. 2). Although a single instance of subcarrier band 302 is depicted in FIG. 3A for descriptive purposes, it will be understood that subcarrier band 302 may be representative of each of a plurality of subcarrier bands included in a superchannel (see also FIG. 5A). Thus, subcarrier power spectrum 300 is a generalized representation and is not drawn to scale.

In subcarrier power spectrum 300, subcarrier band 302 has center frequency $f_C$ and spans from initial frequency $f_0$ to terminal frequency $f_T$. Accordingly, a passband for subcarrier band 302 may be given by $(f_T-f_0)$. Also shown in FIG. 3A is power level, $P_C$, representing an optical power level indicative of subcarrier band 302 at center frequency $f_C$. As shown, subcarrier band 302 is frequency modulated using a frequency range $v_{\Delta FM}$, which may represent a modulation range about a unique frequency $v_{FM}$ for subcarrier band 302 within a superchannel, or within an optical transport network transmitting a plurality of superchannels. Accordingly, a modulation index using FM modulation is given by $v_{\Delta FM}/v_{FM}$. In various embodiments, $v_{FM}$ (or values within $v_{\Delta FM}$) may be smaller than a baud rate of a data stream that is also modulated onto subcarrier band 302, for example using any of a variety of modulation techniques described above with respect to FIG. 1. In various embodiments, $v_{FM}$ and $v_{\Delta FM}$ are in the radio frequency (RF) range of the spectrum. For example, $v_{FM}$ may be less than about 300 MHz. It is noted that an FM modulation amplitude is represented schematically by $v_{\Delta FM}$ and is not illustrated to scale in FIG. 3A, but may be chosen as desired and suitable for a given application or embodiment of superchannel subcarrier monitoring using FM tone modulation. Thus, upon modulation with data and with FM tone using frequency range $v_{\Delta FM}$, subcarrier band 302 may be transmitted at least over certain portions of optical transport network 101 (see FIG. 1), along with other subcarrier bands as a superchannel.

Then, at various desired locations within optical transport network 101, optical subcarrier monitoring may be performed to determine various characteristics of subcarrier band 302 during or after transmission, as will be described in further detail in FIG. 4A. For the purpose of optical subcarrier monitoring, a tunable bandpass filter (TBPF), represented by TBPF band 304, may be tuned over an optical frequency range, such as over a scanning range of $f_0$ to $f_T$, and used to scan subcarrier band 302, among other subcarrier bands. As shown, the scanning may be performed in direction 320. In other embodiments, other directions or methods of scanning subcarrier band 320 may be implemented. As TBPF band 304 is used to scan subcarrier band 302 with FM tone modulation, the falling or rising edge of TBPF band 304 may act as a frequency discriminator, such that an output of the tunable bandpass filter shows a conversion of the FM tone at $v_{FM}$ to a power variation when TBPF band 304 passes through a rising or falling edge of subcarrier band 302, which is described below with respect to FIG. 4A.

Figure 4A:
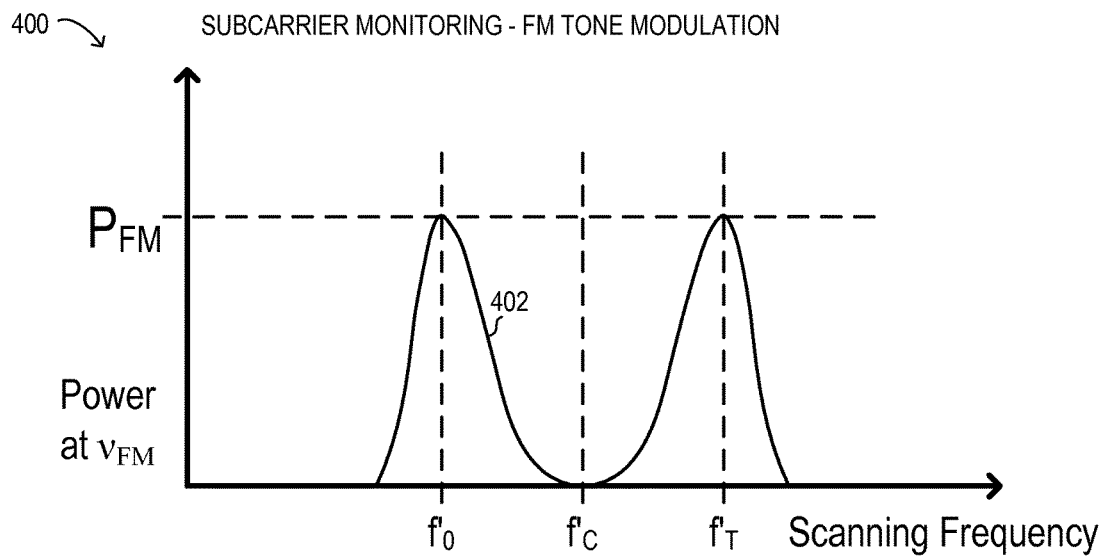
FIG. 4A is a subcarrier power spectrum showing selected elements of an embodiment of subcarrier monitoring with FM tone modulation.

FIG. 4A shows selected elements of an embodiment of subcarrier monitoring 400 with FM tone modulation, where power variation 402 results from the scanning of subcarrier band 302 using TBPF band 304, as described above with respect to FIG. 3A. In FIG. 4A, the horizontal axis is the scanning frequency of the TBPF that represents a center of TBPF band 304. From the scanning of the TBPF, power variation 402 is generated as a power spectrum indicating a bandpass filtered RF power at the modulation frequency $v_{FM}$. For example, in some implementations of subcarrier monitoring, an RF bandpass filter centered at $v_{FM}$ may be used to obtain power variation 402. Accordingly, power variation 402 is proportional to a convolution of the optical TBPF and the absolute value of a differential of modulated subcarrier band 302 in FIG. 3A. The optical TBPF serves as a frequency discriminator for the demodulation of the modulation frequency $v_{FM}$. As shown, power variation 402 appears as a dual-peak shaped power spectrum signal in which a first spectral peak is approximately aligned with initial frequency $f'_0$ and a second spectral peak is approximately aligned with terminal frequency $f'_T$. The passband of the optical signal given by $(f_T-f_0)$ may be calibrated to observed values of $f'_0$ and $f'_T$ and used for subsequent determinations of the passband. Between the first peak at $f'_0$ and the second peak at $f'_T$, a spectral valley appears in power variation 402 at $f'_C$ that is approximately aligned with center frequency $f_C$. In this manner, power variation 402 may be used to directly measure spectral frequencies and the passband of subcarrier band 302 in a manner that is precise and accurate. Furthermore, power level $P_{FM}$ may be directly measured from power variation 402 as an amplitude of the first peak at $f_0$, the second peak at $f_T$, or combinations thereof. Power level $P_{FM}$ may represent a maximum power level at $v_{FM}$ and may be proportional, or indicative, of $P_C$ for subcarrier band 302. In this manner, optical power $P_C$ for subcarrier band 302 may be determined using power variation 402.

Figure 3B:
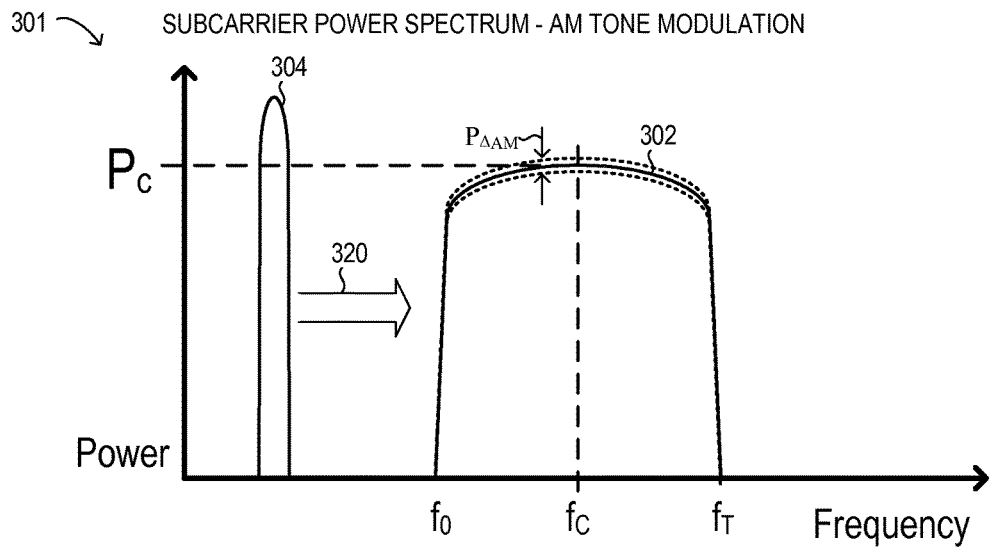
FIG. 3B is a subcarrier power spectrum showing selected elements of an embodiment of AM tone modulation.

Referring now to FIG. 3B, a subcarrier power spectrum 301 showing selected elements of an embodiment of AM tone modulation is illustrated. In subcarrier power spectrum 301, a single optical subcarrier is shown as subcarrier band 302. As shown in FIG. 3B, subcarrier band 302 is depicted in simplified form for descriptive clarity, yet may still correspond to the subcarrier bands depicted in superchannel power spectrum 200 (see FIG. 2). Although a single instance of subcarrier band 302 is depicted in FIG. 3B for descriptive purposes, it will be understood that subcarrier band 302 may be representative of each of a plurality of subcarrier bands included in a superchannel (see also FIG. 5B). Thus, subcarrier power spectrum 301 is a generalized representation and is not drawn to scale.

In subcarrier power spectrum 301, subcarrier band 302 has center frequency $f_C$ and spans from initial frequency $f_0$ to terminal frequency $f_T$. Accordingly, a passband for subcarrier band 302 may be given by $(f_T-f_0)$. Also shown in FIG. 3B is power level, $P_C$, representing an optical power level indicative of subcarrier band 302 at center frequency $f_C$. As shown, subcarrier band 302 is amplitude modulated using a frequency $v_{AM}$ with a peak-to-peak power modulation amplitude given by $P_{\Delta AM}$. In various embodiments, $v_{AM}$ may be substantially smaller than a baud rate of a data stream that is also modulated onto subcarrier band 302, for example using any of a variety of modulation techniques described above with respect to FIG. 1. In various embodiments, $v_{AM}$ is in the RF range of the spectrum. For example, $v_{AM}$ may be less than about 300 MHz. It is noted that $P_{\Delta AM}$ is represented schematically for $v_{AM}$ and is not illustrated to scale in FIG. 3B, but may be chosen as desired and suitable for a given application or embodiment of superchannel subcarrier monitoring using AM tone modulation. For example, $P_{\Delta AM}$ may be less than 10% of $P_c$, and in particular, about 5% of $P_c$ in given embodiments. Furthermore, a phase of the AM tone at frequency $v_{AM}$ may be chosen for subcarrier band 302, as will be described in further detail with respect to FIG. 6B. Thus, upon modulation with data and with the AM tone at frequency $v_{AM}$, subcarrier band 302 may be transmitted at least over certain portions of optical transport network 101 (see FIG. 1), along with other subcarrier bands as a superchannel.

Then, at various desired locations within optical transport network 101, optical subcarrier monitoring may be performed to determine various characteristics of subcarrier band 302 during or after transmission, as will be described in further detail in FIG. 4B. For the purpose of optical subcarrier monitoring, a tunable bandpass filter (TBPF), represented by TBPF band 304, may be tuned over an optical frequency range, such as over a scanning range of $f_0$ to $f_T$, and used to scan subcarrier band 302, among other subcarrier bands. As shown, the scanning may be performed in direction 320. In other embodiments, other directions or methods of scanning subcarrier band 320 may be implemented. As TBPF band 304 is used to scan subcarrier band 302 with AM tone modulation, a power variation profile that is proportional to a convolution of the optical TBPF and the optical spectral profile of subcarrier band 302 in FIG. 3B is generated. The resulting power variation of the AM tone will follow the general optical spectral profile of subcarrier band 302, as TBPF band 304 passes through a rising or falling edge of subcarrier band 302, which is described below with respect to FIG. 4B.

Figure 4B:
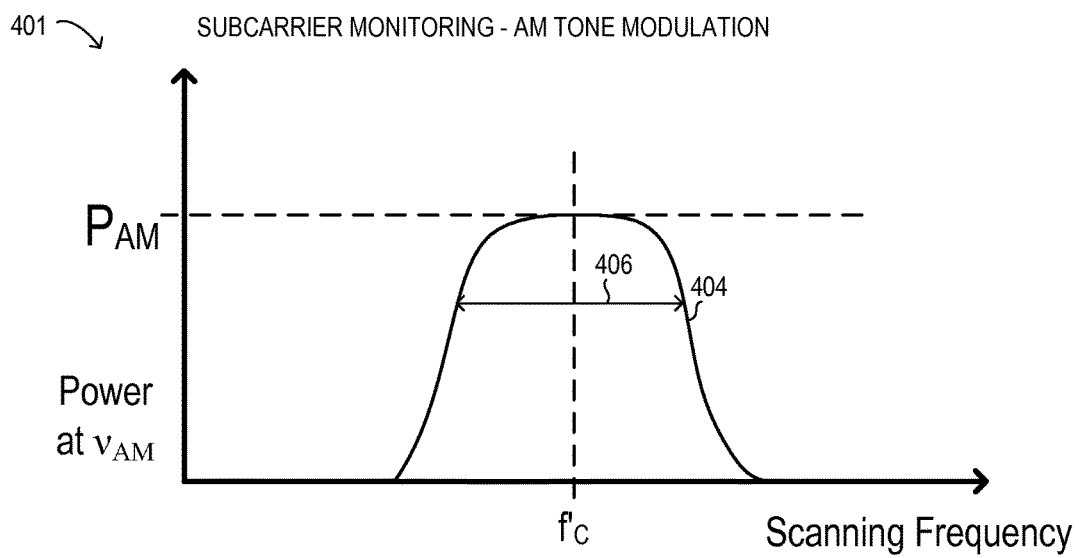
FIG. 4B is a subcarrier power spectrum showing selected elements of an embodiment of subcarrier monitoring with AM tone modulation.

FIG. 4B shows selected elements of an embodiment of subcarrier monitoring 401 with AM tone modulation, where power variation 404 results from the scanning of subcarrier band 302 using TBPF band 304, as described above with respect to FIG. 3B. In FIG. 4B, the horizontal axis is the scanning frequency of the tunable bandpass filter that represents a center of TBPF band 304. From the scanning of the tunable bandpass filter, power variation 404 is generated as a power spectrum indicating a bandpass filtered RF power at the modulation frequency $v_{AM}$. As shown, power variation 404 appears as a power spectrum band that is similarly shaped as subcarrier band 302. Specifically, power variation 404 is centered at center frequency $f'_C$ and exhibits a bandwidth 406 that is proportional to, or indicative of, passband $(f_T-f_0)$. The measured center frequency $f'_C$ may be aligned with, or correlated with, center frequence $f_c$. Furthermore, power level $P_{AM}$ may be directly measured from power variation 404 as an amplitude at $f'_C$. Power level $P_{AM}$ may represent a maximum power level at $v_{AM}$ and may be proportional, or indicative, of $P_C$ for subcarrier band 302. In this manner, optical power $P_C$ for subcarrier band 302 may be determined using power variation 404.

Figure 5A:
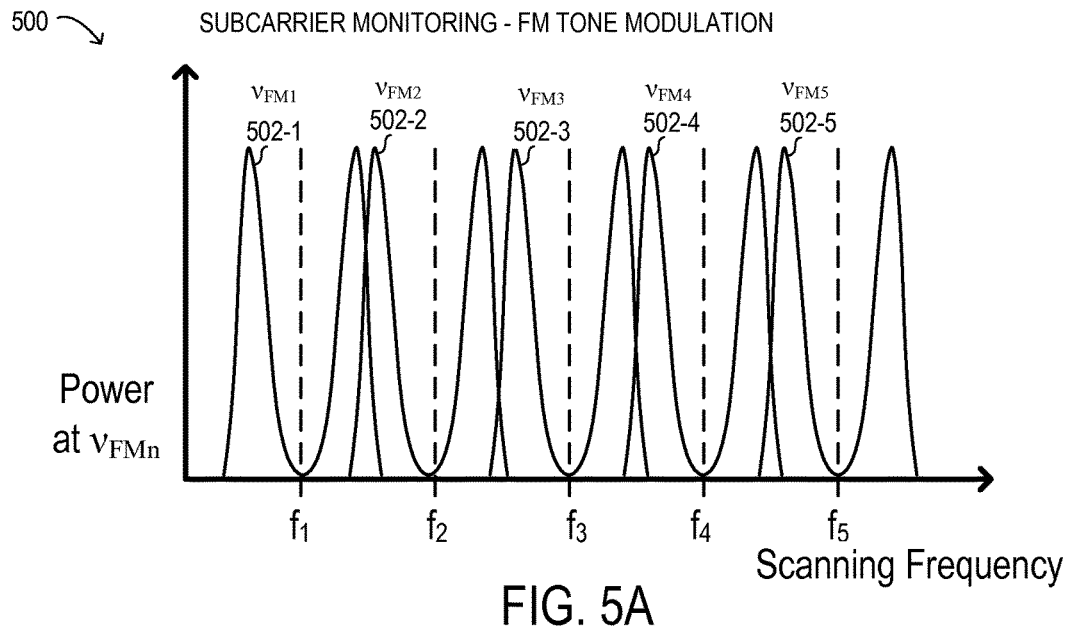
FIG. 5A is a subcarrier power spectrum showing selected elements of an embodiment of subcarrier monitoring with FM tone modulation.

Referring now to FIG. 5A, an embodiment of subcarrier monitoring 500 with FM tone modulation is illustrated for a superchannel corresponding to superchannel power spectrum 200 in FIG. 2. In subcarrier monitoring 500, power variations 502 result from the scanning of five (5) subcarrier bands at center frequencies, $f_1$, $f_2$, $f_3$, $f_4$, and $f_5$, respectively. Power variation 502-1 is for a first subcarrier band having center frequency $f_1$ and modulated with FM tone having frequency $v_{FM1}$; power variation 502-2 is for a second subcarrier band having center frequency $f_2$ and modulated with FM tone having frequency $v_{FM2}$; power variation 502-3 is for a third subcarrier band having center frequency $f_3$ and modulated with FM tone having frequency $v_{FM3}$; power variation 502-4 is for a fourth subcarrier band having center frequency $f_4$ and modulated with FM tone having frequency $v_{FM4}$; and power variation 502-5 is for a fifth subcarrier band having center frequency $f_5$ and modulated with FM tone having frequency $v_{FM5}$. It is noted that FM tone frequencies $v_{FM1}$, $v_{FM2}$, $v_{FM3}$, $v_{FM4}$, and $v_{FM5}$ may be unique frequencies within the superchannel or within the optical transport network. As in FIG. 4A, power variations 502 appear as dual-peak shaped power signals for each respective subcarrier band. Because each instance of power variation 502 is specific to a unique frequency $v_{FMn}$, each power variation 502 may be individually resolved to detect, uniquely identify, and monitor a specific subcarrier band using FM tone modulation, as described herein.

Figure 5B:
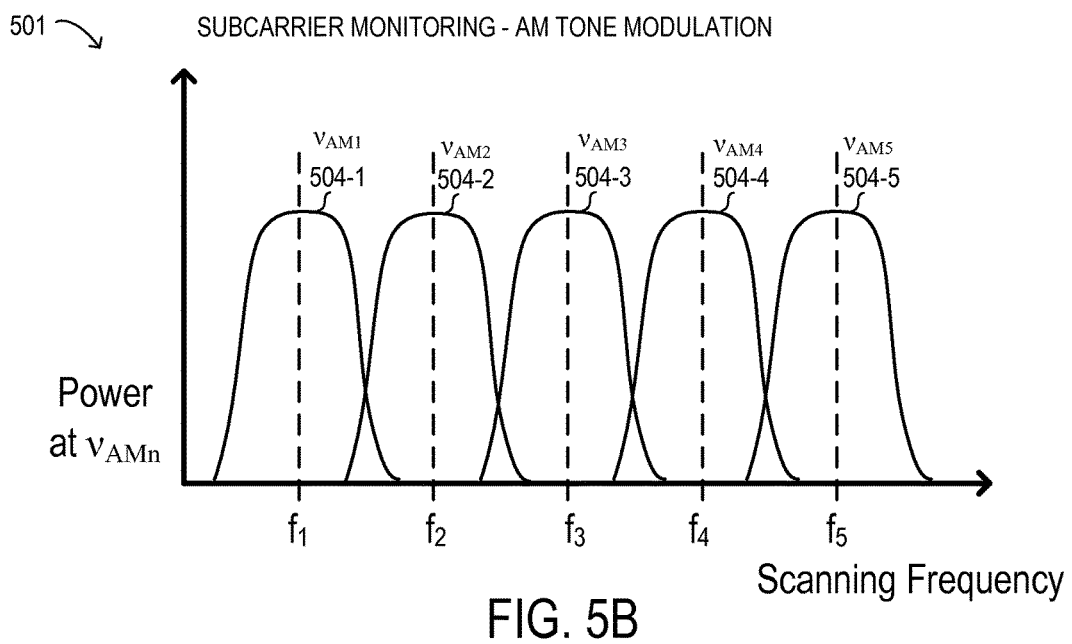
FIG. 5B is a subcarrier power spectrum showing selected elements of an embodiment of subcarrier monitoring with AM tone modulation.

Referring now to FIG. 5B, an embodiment of subcarrier monitoring 501 with AM tone modulation is illustrated for a superchannel corresponding to superchannel power spectrum 200 in FIG. 2. In subcarrier monitoring 501, power variations 504 result from the scanning of five (5) subcarrier bands at center frequencies, $f_1$, $f_2$, $f_3$, $f_4$, and $f_5$, respectively. Power variation 504-1 is for a first subcarrier band having center frequency $f_1$ and modulated with AM tone having frequency $v_{AM1}$; power variation 504-2 is for a second subcarrier band having center frequency $f_2$ and modulated with AM tone having frequency $v_{AM2}$; power variation 504-3 is for a third subcarrier band having center frequency $f_3$ and modulated with AM tone having frequency $v_{AM3}$; power variation 504-4 is for a fourth subcarrier band having center frequency $f_4$ and modulated with AM tone having frequency $v_{AM4}$; and power variation 504-5 is for a fifth subcarrier band having center frequency $f_5$ and modulated with AM tone having frequency $v_{AM5}$. It is noted that AM tone frequencies $v_{AM1}$, $v_{AM2}$, $v_{AM3}$, $v_{AM4}$, and $v_{AM5}$ may be individually associated with a phase shift and certain pairs of the AM tone frequencies may be common frequencies (see also FIG. 6B). As in FIG. 4B, power variations 504 appear as band shaped power signals for each respective subcarrier band. Because each instance of power variation 504 is specific to a subcarrier band, each power variation 504 may be individually resolved to detect, uniquely identify, and monitor a specific subcarrier band using AM tone modulation, as described herein.

Figure 6A:
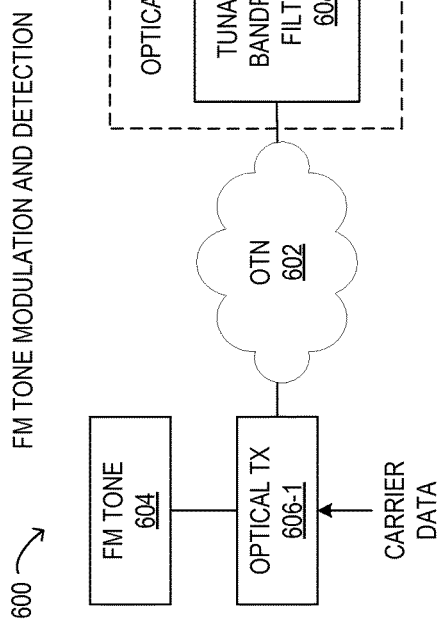
FIG. 6A is a block diagram of selected elements of an embodiment of modulation and detection for superchannel subcarrier monitoring with FM tone modulation.
Figure 6B:
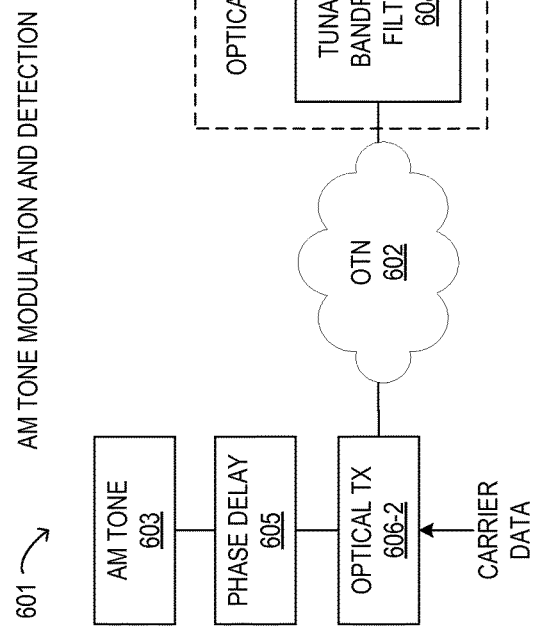
FIG. 6B is a block diagram of selected elements of an embodiment of modulation and detection for superchannel subcarrier monitoring with AM tone modulation.

Referring now to FIG. 6A, a block diagram of selected elements of an embodiment of FM tone modulation and detection 600 for superchannel subcarrier monitoring is illustrated. Although FM tone modulation and detection 600 depicts a single subcarrier, it will be understood that multiple subcarriers may be modulated with FM tones and detected for a given superchannel. It is noted that functionality described with respect to FIGS. 6A and 6B, representing FM tone modulation and AM tone modulation, respectively, may be combined or may be implemented with common components, in various embodiments. At least certain portions of optical subcarrier monitor 620 may be included in an optical channel monitor (OCM).

In FM tone modulation and detection 600, FM tone modulation is performed using optical transmitter 606-1, which may be an embodiment of transmitter 102 in FIG. 1. Thus, optical transmitter 606-1 may receive and modulate carrier data onto the optical subcarrier according to various types of modulation and carrier techniques described herein. Additionally, optical transmitter 606-1 may modulate FM tone 604 onto the optical subcarrier, which is combined with other subcarriers into the superchannel and transmitted over optical transport network 602. As noted, FM tone 604 may be unique to a given optical subcarrier within the superchannel or within optical transport network 602, which may represent at least certain portions of optical transport network 101 in FIG. 1.

At some location within optical transport network 602, optical subcarrier monitor 620-1 may be employed to receive the superchannel and to detect and monitor individual optical subcarriers. Accordingly, optical subcarrier monitor 620-1 includes tunable bandpass filter (TBPF) 608 for spectral scanning using TBPF band 304, as described above with respect to FIG. 3A. An output of tunable bandpass filter 608 is received by optical power sensor 610, which may represent a photodiode or a similar opto-electronic element, which outputs an electrical signal to analog-to-digital converter (ADC) 612. ADC 612 may digitize the electrical signal and send digital signals or data to FM tone demodulator 614. FM tone demodulator 614 may include various combinations of hardware and software, such as a digital signal processor (DSP) and associated executable instructions, for demodulating FM tone 604 and generating power variation 402 (see FIG. 4A) indicative of the optical subcarrier. It is noted that optical subcarrier monitor 620-1 may communicate with optical transmitter 606-1 using a network control system, such as control system 700 in FIG. 7, for example, to receive modulation information, such as a frequency of FM tone 604. Because the frequency of FM tone 604 is unique, detection of the frequency by optical subcarrier monitor 620-1 may uniquely identify the optical subcarrier. Conversely, when the unique frequency of FM tone 604 that is assigned to an optical subcarrier is not detected by optical subcarrier monitor 620-1, then a determination may be made that the optical subcarrier is missing from the superchannel.

Referring now to FIG. 6B, a block diagram of selected elements of an embodiment of AM tone modulation and detection 601 for superchannel subcarrier monitoring is illustrated. Although AM tone modulation and detection 601 depicts a single subcarrier, it will be understood that multiple subcarriers may be modulated with AM tones and detected for a given superchannel. It is noted that functionality described with respect to FIGS. 6A and 6B, representing FM tone modulation and AM tone modulation, respectively, may be combined or may be implemented with common components, in various embodiments. At least certain portions of optical subcarrier monitor 620 may be included in an optical channel monitor (OCM).

In AM tone modulation and detection 601, AM tone modulation is performed using optical transmitter 606-2, which may be an embodiment of transmitter 102 in FIG. 1. Thus, optical transmitter 606-2 may receive and modulate carrier data onto the optical subcarrier according to various types of modulation and carrier techniques described herein. Additionally, optical transmitter 606-2 may modulate AM tone 603 onto the optical subcarrier, which is combined with other subcarriers into the superchannel and transmitted over optical transport network 602, which may represent at least certain portions of optical transport network 101 in FIG. 1. Additionally, a phase delay 605 may be applied to AM tone 603 prior to modulation at optical transmitter 606-2. It is noted that in some embodiments, phase delay 605 may be integrated within AM tone 603 or optical transmitter 606-2.

When AM tone modulation is performed, a variation in the power intensity of the optical subcarrier is inherently introduced. For this reason, the frequency of the AM tone, $v_{AM}$, may be chosen to be substantially smaller than a baud rate of the data modulated by optical transmitter 606-2. However, when unique frequency values for $v_{AM}$ are chosen during AM tone modulation for each subcarrier in a superchannel, a net power modulation of the superchannel may result, which is undesirable. Therefore, during AM tone modulation, as described herein, individual AM tone frequencies may be shared by pairs of optical subcarriers in a superchannel, and a phase of the AM tones for a pair of subcarriers may be set to be complementary to each other. In this manner, each optical subcarrier is modulated with a unique AM tone and phase combination, while an overall average power for the superchannel remains unchanged or is minimized. Table 1 below shows frequency and phase of the AM tones used in an example of a superchannel having four (4) subcarriers to represent the general case of an even number of subcarriers in a superchannel. Table 2 below shows frequency and phase of the AM tones used in an example of a superchannel having five (5) subcarriers to represent the general case of an odd number of subcarriers in a superchannel.

TABLE 1

AM tone modulation example for an even number of subcarriers in a superchannel

| Subcarrier | Frequency | Phase |
| --- | --- | --- |
| 1 | $v_a$ | 0° |
| 2 | $v_b$ | 0° |
| 3 | $v_a$ | 180° |
| 4 | $v_b$ | 180° |

In Table 1, $v_a$ and $v_b$ are given modulation frequencies for the AM tone. Alternating subcarriers 1 and 3 share frequency $v_a$, while alternating subcarriers 2 and 4 share frequency $v_b$. Because the AM tone for subcarrier pairs 1, 3 and 2, 4 are complementary in phase and the pairs share the same frequency, optical power variations resulting from the AM tone modulation will destructively interfere and will be eliminated. It is noted that other arrangements of frequency and phase may be used in various embodiments of an even number of subcarriers.

TABLE 2

AM tone modulation example for an odd
number of subcarriers in a superchannel

| Subcarrier | Frequency | Phase |
|---|---|---|
| 1 | $v_a$ | 0° |
| 2 | $v_b$ | 0° |
| 3 | $v_c$ | 0° |
| 4 | $v_a$ | 180° |
| 5 | $v_b$ | 180° |

In Table 2, subcarriers 1 and 4 share frequency $v_a$, while subcarriers 2 and 5 share frequency $v_b$. Because the AM tone for subcarrier pairs 1, 4 and 2, 5 are complementary in phase and the pairs share the same frequency, optical power variations resulting from the AM tone modulation will destructively interfere and will be eliminated for subcarriers 1, 2, 4, and 5. Thus, a net power variation for the superchannel may arise from frequency $v_c$ used by center subcarrier 3, which may represent a minimum optical power variation for AM tone modulation. It is noted that other arrangements of frequency and phase may be used in various embodiments of an odd number of subcarriers. For example, in some embodiments, AM tone modulation may not be used with a center subcarrier when an odd number of subcarriers are present, such as with subcarrier 3 in Table 2. For example, another type of modulation, such as FM modulation, may be used with the center subcarrier when an odd number of subcarriers are present in a superchannel. In some instances, no modulation may be used with the center subcarrier when an odd number of subcarriers are present in a superchannel.

At some location within optical transport network 602, optical subcarrier monitor 620-2 may be employed to receive the superchannel and to detect and monitor individual optical subcarriers. Accordingly, optical subcarrier monitor 620-2 includes tunable bandpass filter (TBPF) 608 for spectral scanning using TBPF band 304, as described above with respect to FIG. 3B. An output of tunable bandpass filter 608 is received by optical power sensor 610, which may represent a photodiode or a similar opto-electronic element, which outputs an electrical signal to analog-to-digital converter (ADC) 612. ADC 612 may digitize the electrical signal and send digital signals or data to AM tone demodulator 616. AM tone demodulator 616 may include various combinations of hardware and software, such as a digital signal processor (DSP) and associated executable instructions, for demodulating AM tone 603 and phase delay 605 and generating power variation 404 (see FIG. 4B) indicative of the optical subcarrier. It is noted that optical subcarrier monitor 620-2 may communicate with optical transmitter 606-2 using a network control system, such as control system 700 in FIG. 7, for example, to receive modulation information, such as a frequency of AM tone 603 and phase delay 605. Because the combination of frequency and phase of AM tone 603 is unique, detection of the frequency by optical subcarrier monitor 620-2 may uniquely identify the optical subcarrier. Conversely, when a unique combination of frequency and phase of AM tone 603 that is assigned to an optical subcarrier is not detected by optical subcarrier monitor 620-2, then a determination may be made that the optical subcarrier is missing from the superchannel.

Figure 7:
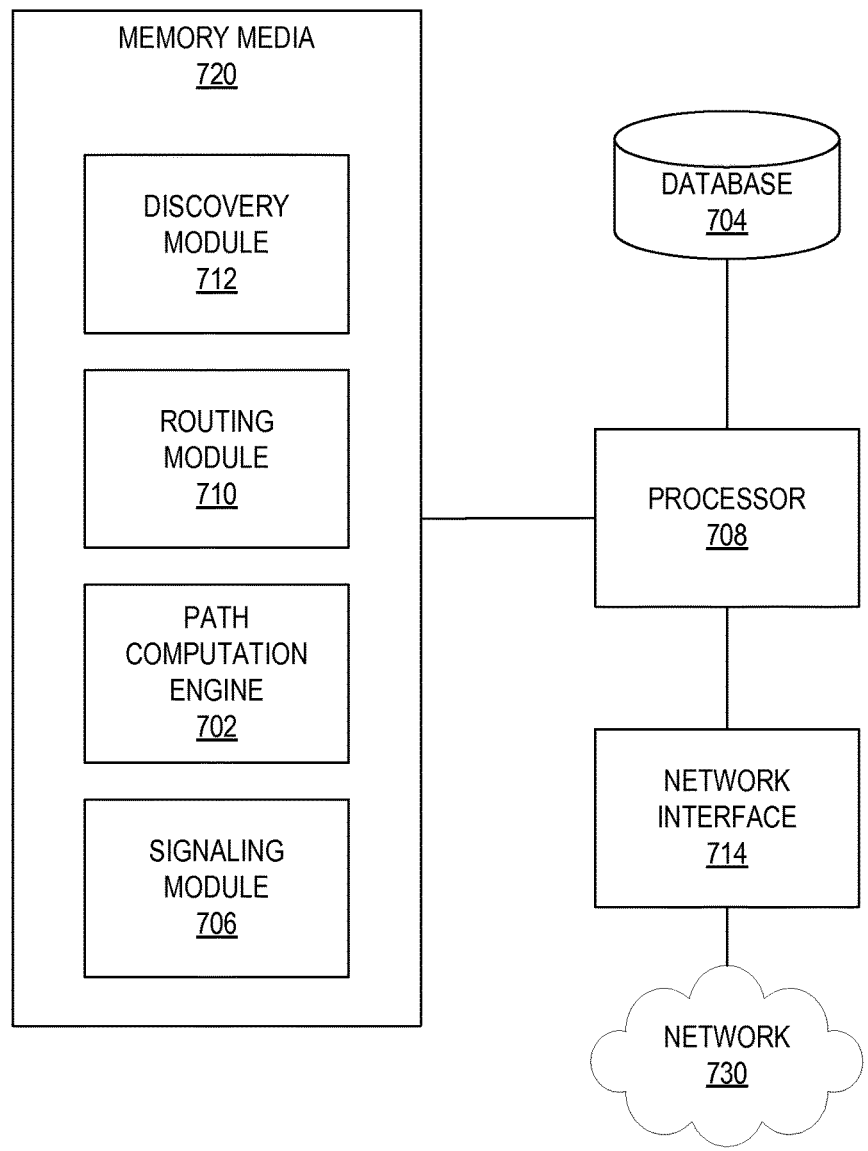
FIG. 7 is a block diagram of selected elements of an embodiment of an optical control plane system for superchannel subcarrier monitoring.

Referring now to FIG. 7, a block diagram of selected elements of an embodiment of control system 700 for implementing control plane functionality in optical networks, such as, for example, in optical transport network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by control system 700 may work together to automatically establish services within the optical network. Discovery module 712 may discover local links connecting to neighbors. Routing module 710 may broadcast local link information to optical network nodes while populating database 704. When a request for service from the optical network is received, path computation engine 702 may be called to compute a network path using database 704. This network path may then be provided to signaling module 706 to establish the requested service.

As shown in FIG. 7, control system 700 includes processor 708 and memory media 720, which may store executable instructions (i.e., executable code) that may be executable by processor 708, which has access to memory media 720. Processor 708 may execute instructions that cause control system 700 to perform the functions and operations described herein. For the purposes of this disclosure, memory media 720 may include non-transitory computer-readable media that stores data and instructions for at least a period of time. Memory media 720 may comprise persistent and volatile media, fixed and removable media, and magnetic and semiconductor media. Memory media 720 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 720 is operable to store instructions, data, or both. Memory media 720 as shown includes sets or sequences of instructions that may represent executable computer programs, namely, path computation engine 702, signaling module 706, discovery module 712, and routing module 710.

Also shown included with control system 700 in FIG. 7 is network interface 714, which may be a suitable system, apparatus, or device operable to serve as an interface between processor 708 and network 730. Network interface 714 may enable control system 700 to communicate over network 730 using a suitable transmission protocol or standard. In some embodiments, network interface 714 may be communicatively coupled via network 730 to a network storage resource. In some embodiments, network 730 represents at least certain portions of optical transport network 101. Network 730 may also include certain portions of a network using galvanic or electronic media. In certain embodiments, network 730 may include at least certain portions of a public network, such as the Internet. Network 730 may be implemented using hardware, software, or various combinations thereof.

In certain embodiments, control system 700 may be configured to interface with a person (a user) and receive data about the optical signal transmission path. For example, control system 700 may also include or may be coupled to one or more input devices and output devices to facilitate receiving data about the optical signal transmission path from the user and to output results to the user. The one or more input or output devices (not shown) may include, but are not limited to, a keyboard, a mouse, a touchpad, a microphone, a display, a touchscreen display, an audio speaker, or the like. Alternately or additionally, control system 700 may be configured to receive data about the optical signal transmission path from a device such as another computing device or a network element, for example via network 730.

As shown in FIG. 7, in some embodiments, discovery module 712 may be configured to receive data concerning an optical signal transmission path in an optical network and may be responsible for discovery of neighbors and links between neighbors. In other words, discovery module 712 may send discovery messages according to a discovery protocol, and may receive data about the optical signal transmission path. In some embodiments, discovery module 712 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 7, routing module 710 may be responsible for propagating link connectivity information to various nodes within an optical network, such as optical transport network 101. In particular embodiments, routing module 710 may populate database 704 with resource information to support traffic engineering, which may include link bandwidth availability. Accordingly, database 704 may be populated by routing module 710 with information usable to determine a network topology of an optical network.

Path computation engine 702 may be configured to use the information provided by routing module 710 to database 704 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 702 may consider the interplay between the transmission degradation factors. In various embodiments, path computation engine 702 may generate values for specific transmission degradation factors. Path computation engine 702 may further store data describing the optical signal transmission path in database 704.

In FIG. 7, signaling module 706 may provide functionality associated with setting up, modifying, and tearing down end-to-end networks services in an optical network, such as optical transport network 101. For example, when an ingress node in the optical network receives a service request, control system 100 may employ signaling module 706 to request a network path from path computation engine 702 that may be optimized according to different criteria, such as bandwidth, cost, etc. When the desired network path is identified, signaling module 706 may then communicate with respective nodes along the network path to establish the requested network services. In different embodiments, signaling module 706 may employ a signaling protocol to propagate subsequent communication to and from nodes along the network path.

In operation of control system 700, optical subcarrier monitor 620 described previously with respect to FIGS. 6A and 6B may receive information about modulation of FM tones or AM tones for a particular subcarrier or all subcarriers in a superchannel. For example, when superchannel subcarrier monitoring using FM tones is implemented at an optical transmitter, as described herein, optical subcarrier monitor 620 may receive unique frequency information from control system 700 for each respective subcarrier that has been modulated with a respectively unique FM tone. When superchannel subcarrier monitoring using AM tones is implemented at an optical transmitter, as described herein, optical subcarrier monitor 620 may receive frequency information and phase information from control system 700 for each respective subcarrier that has been modulated using an AM tone. Optical subcarrier monitor 620 may use the received information for tuning tunable bandpass filter 608 and for demodulating the optical subcarrier, as described above.

Figure 8:
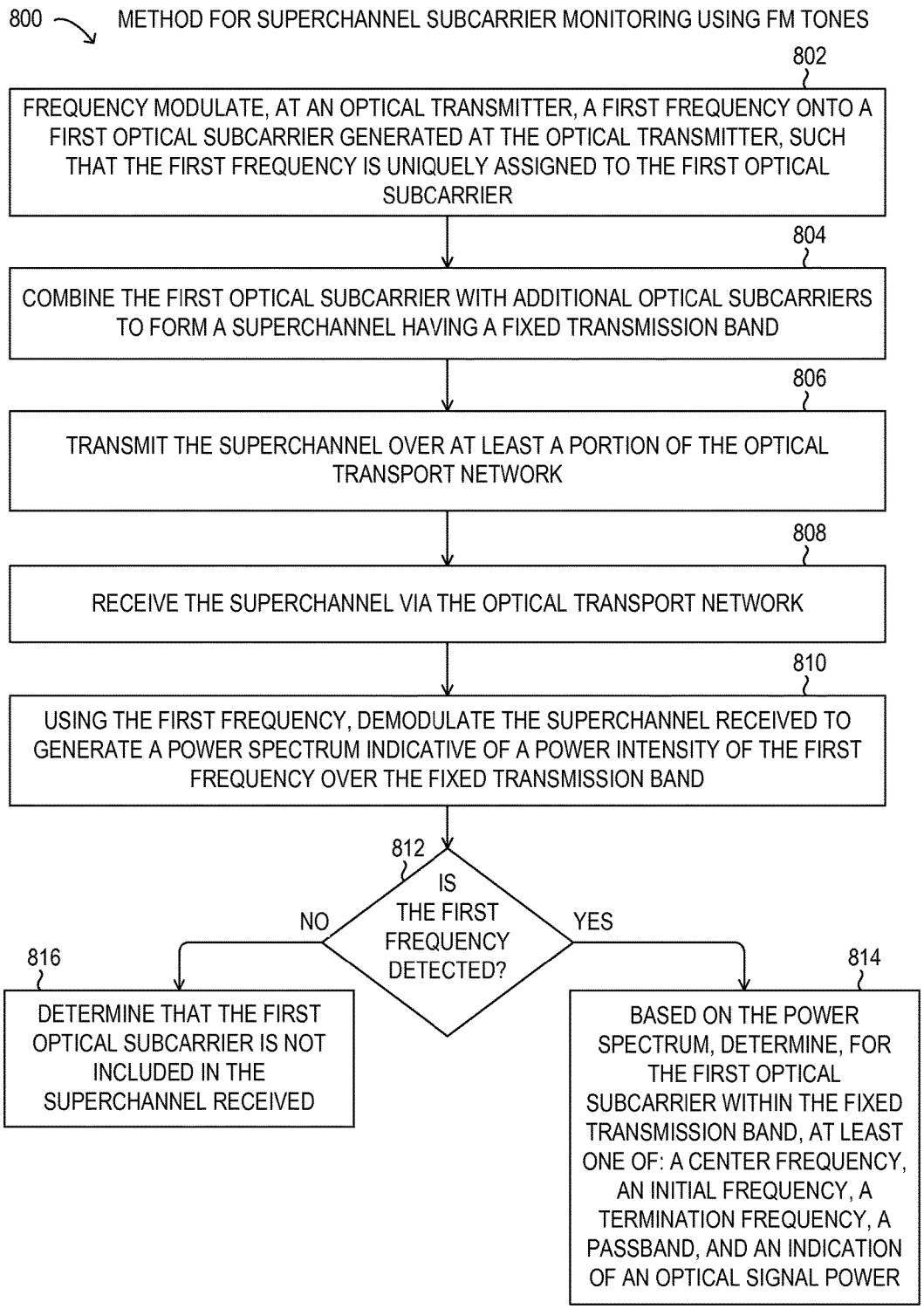
FIG. 8 is a flow chart of selected elements of an embodiment of a method for superchannel subcarrier monitoring with FM tone modulation.

Referring now to FIG. 8, a method 800 for superchannel subcarrier monitoring using frequency modulated (FM) tones is shown in flow chart form. As shown method 800 may be performed using optical transport network 101 (see FIG. 1) in conjunction with optical subcarrier monitor 620 (see FIGS. 6A and 6B) and optical control plane system 700 (see FIG. 7). It is noted that operations described with respect to method 800 may be omitted or rearranged in different embodiments.

Method 800 may begin by frequency modulating (operation 802), at an optical transmitter, a first frequency onto a first optical subcarrier generated at the optical transmitter, such that the first frequency is uniquely assigned to the first optical subcarrier. The first optical subcarrier is optically modulated with carrier data at an optical transmission frequency. The first optical subcarrier may be combined (operation 804) with additional optical subcarriers to form a superchannel having a fixed transmission band. The superchannel may be transmitted (operation 806) over at least a portion of the optical transport network. The superchannel may be received (operation 808) via the optical transport network. Using the first frequency, the superchannel received may be demodulated (operation 810) to generate a power spectrum indicative of a power intensity of the first frequency over the fixed transmission band. Then in method 800, a decision may be made whether the first frequency is detected (operation 812). When the result of operation 812 is NO, method 800 may determine (operation 816) that the first optical subcarrier is not included in the superchannel received. When the result of operation 812 is YES, method 800 may, based on the power spectrum, determine (operation 814), for the first optical subcarrier within the fixed transmission band, at least one of: a center frequency, an initial frequency, a termination frequency, a passband, and an indication of an optical signal power.

Figure 9:
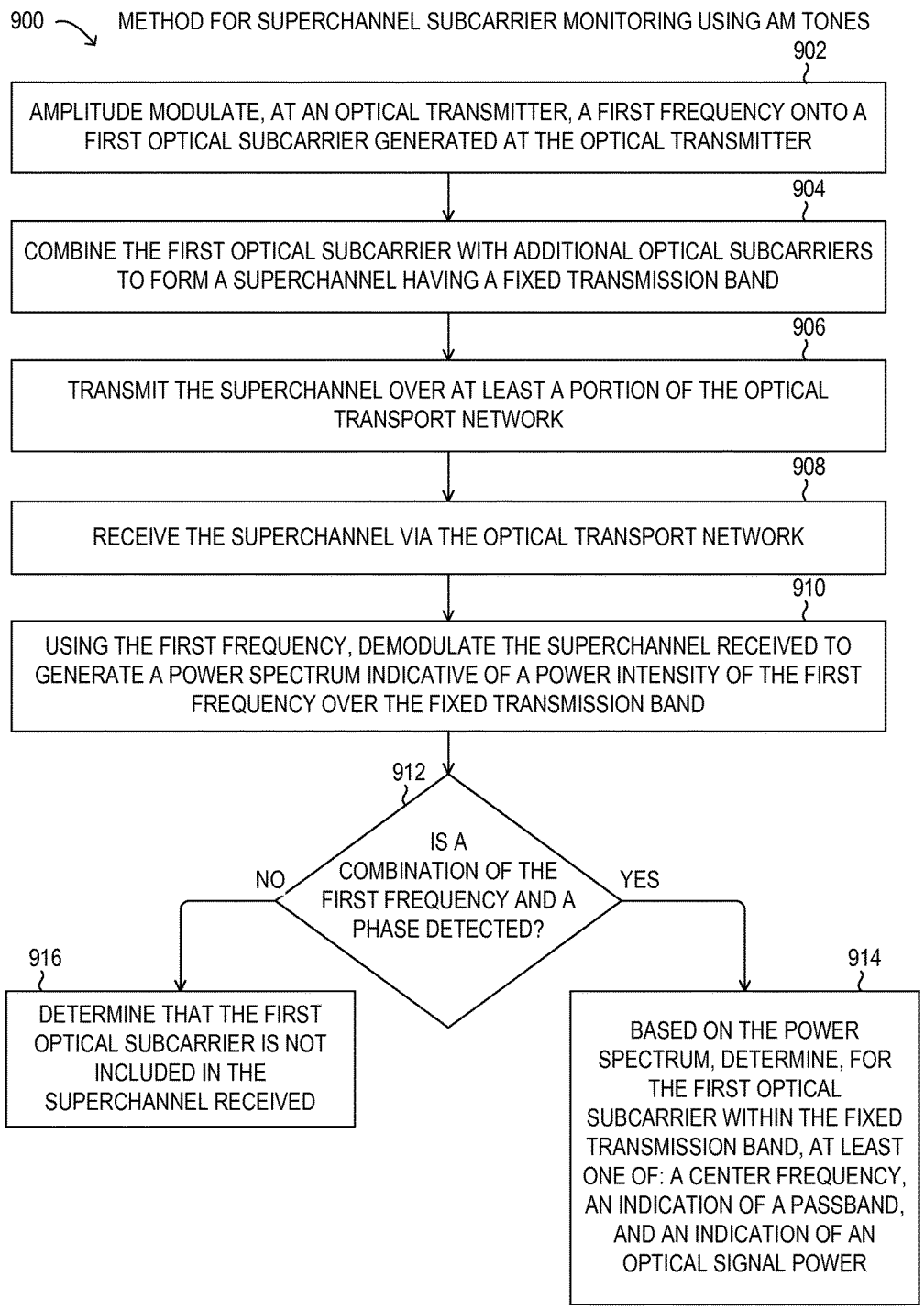
FIG. 9 is a flow chart of selected elements of an embodiment of a method for superchannel subcarrier monitoring with AM tone modulation.

Referring now to FIG. 9, a method 900 for superchannel subcarrier monitoring using amplitude modulated (AM) tones is shown in flow chart form. As shown method 900 may be performed using optical transport network 101 (see FIG. 1) in conjunction with optical subcarrier monitor 620 (see FIGS. 6A and 6B) and optical control plane system 700 (see FIG. 7). It is noted that operations described with respect to method 900 may be omitted or rearranged in different embodiments.

Method 900 may begin by amplitude modulating (operation 902), at an optical transmitter, a first frequency onto a first optical subcarrier generated at the optical transmitter. The first optical subcarrier is optically modulated with carrier data at an optical transmission frequency. The first optical subcarrier may be combined (operation 904) with additional optical subcarriers to form a superchannel having a fixed transmission band. The superchannel may be transmitted (operation 906) over at least a portion of the optical transport network. The superchannel may be received (operation 908) via the optical transport network. Using the first frequency, the superchannel received may be demodulated (operation 910) to generate a power spectrum indicative of a power intensity of the first frequency over the fixed transmission band. Then in method 900, a decision may be made whether a combination of the first frequency and a phase is detected (operation 912). When the result of operation 912 is NO, method 800 may determine (operation 916) that the first optical subcarrier is not included in the superchannel received. When the result of operation 912 is YES, method 900 may, based on the power spectrum, determine (operation 914), for the first optical subcarrier within the fixed transmission band, at least one of: a center frequency, an indication of a passband, and an indication of an optical signal power.

As disclosed herein, methods and systems for superchannel subcarrier monitoring using amplitude modulated (AM) tones include amplitude modulating an optical subcarrier of a superchannel with a first frequency that is chosen to be substantially smaller than an optical transmission frequency for carrier data modulated onto the optical subcarrier. Certain pairs of subcarriers in the superchannel may be modulated with AM tones having a common frequency with complementary phase for power equalization. Then, downstream detection and monitoring of the optical subcarrier may be performed based on demodulation of the first frequency. Each optical subcarrier in the superchannel may be modulated using a respectively unique combination of AM tone and phase.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method for monitoring subcarriers of superchannels using amplitude modulation (AM), the method comprising:
    amplitude modulating, at an optical transmitter of an optical transport network, a first frequency onto a first optical subcarrier modulated with carrier data at an optical transmission frequency, wherein the first frequency is smaller than the optical transmission frequency;
    combining the first optical subcarrier with additional optical subcarriers to form a superchannel having a fixed transmission band;
    transmitting the superchannel over at least a portion of the optical transport network;
    receiving the superchannel via the optical transport network; and
    demodulating, based on the first frequency, the superchannel received to generate a power spectrum indicative of a power intensity of the first frequency over the fixed transmission band.

2. The method of claim 1, further comprising:
    based on the power spectrum, determining a center frequency of the first optical subcarrier within the fixed transmission band.

3. The method of claim 1, further comprising:
    based on the power spectrum, determining an indication of a passband for the first optical subcarrier.

4. The method of claim 1, further comprising:
    based on the power spectrum, determining an indication of an optical signal power of the first optical subcarrier within the fixed transmission band, wherein a peak-to-peak power modulation amplitude at the first frequency is less than 10% of the optical signal power.

5. The method of claim 1, wherein demodulating the superchannel received includes:
    scanning a tunable bandpass filter tuned to at least a portion of the fixed transmission band of the superchannel.

6. The method of claim 5, wherein demodulating the superchannel received includes:
    digitizing a power signal indicative of an output of the tunable bandpass filter; and
    using a digital signal processor to resolve the power spectrum.

7. The method of claim 1, wherein the first frequency is less than 300 MHz.

8. The method of claim 1, further comprising:
    amplitude modulating the additional optical subcarriers, wherein:
    adjacent optical subcarriers are amplitude modulated with different frequencies;
    at least some pairs of non-adjacent optical subcarriers are amplitude modulated using a common frequency; and
    each optical subcarrier in a pair is amplitude modulated using the common frequency with a complementary phase to the other optical subcarrier in the pair.

9. The method of claim 8, wherein demodulating the superchannel received includes demodulating a pair of the non-adjacent optical subcarriers using the common frequency based on the complementary phase.

10. The method of claim 8, wherein demodulating the superchannel received includes:
    when a combination of the first frequency and a phase for the first optical subcarrier is not detected, determining that the first optical subcarrier is not included in the superchannel received.

11. An optical transport network enabled for monitoring subcarriers of superchannels using amplitude modulation (AM), the optical transport network comprising:
    an optical subcarrier monitor enabled to:
    receive a superchannel having a fixed transmission band transmitted over at least a portion of the optical transport network, wherein the superchannel includes a first optical subcarrier that is modulated with carrier data at an optical transmission frequency and amplitude modulated with a first frequency, wherein the first frequency is smaller than the optical transmission frequency, and wherein the superchannel includes additional optical subcarriers in addition to the first optical subcarrier; and
    demodulate, based on the first frequency, the superchannel received to generate a power spectrum indicative of a power intensity of the first frequency over the fixed transmission band.

12. The optical transport network of claim 11, wherein the optical subcarrier monitor determines, based on the power spectrum, a center frequency of the first optical subcarrier within the fixed transmission band.

13. The optical transport network of claim 11, wherein the optical subcarrier monitor determines, based on the power spectrum, an indication of a passband for the first optical subcarrier.

14. The optical transport network of claim 11, wherein the optical subcarrier monitor determines, based on the power spectrum, an indication of an optical signal power of the first optical subcarrier within the fixed transmission band, and wherein a peak-to-peak power modulation amplitude at the first frequency is less than 10% of the optical signal power.

15. The optical transport network of claim 11, wherein demodulating the superchannel received includes:
scanning a tunable bandpass filter tuned to at least a portion of the fixed transmission band of the superchannel.

16. The optical transport network of claim 15, wherein demodulating the superchannel received includes:
digitizing a power signal indicative of an output of the tunable bandpass filter; and
using a digital signal processor to resolve the power spectrum.

17. The optical transport network of claim 11, wherein the first frequency is less than 300 MHz.

18. The optical transport network of claim 11, further comprising a plurality of optical transmitters to amplitude modulate the first optical subcarrier and the additional optical subcarriers, the plurality of transmitters to:
amplitude modulate the adjacent optical subcarriers, wherein adjacent optical subcarriers are amplitude modulated with different frequencies, wherein at least some pairs of non-adjacent optical subcarriers are amplitude modulated using a common frequency, and wherein each optical subcarrier in a pair is amplitude modulated using the common frequency with a complementary phase to the other optical subcarrier in the pair.

19. The optical transport network of claim 18, wherein demodulating the superchannel received includes:
demodulating a pair of the non-adjacent optical subcarriers using the common frequency based on the complementary phase.

20. The optical transport network of claim 18, wherein demodulating the superchannel received includes:
when a combination of the first frequency and a phase for the first optical subcarrier is not detected, determining that the first optical subcarrier is not included in the superchannel received.

* * * * *